Patented Jan. 12, 1926.

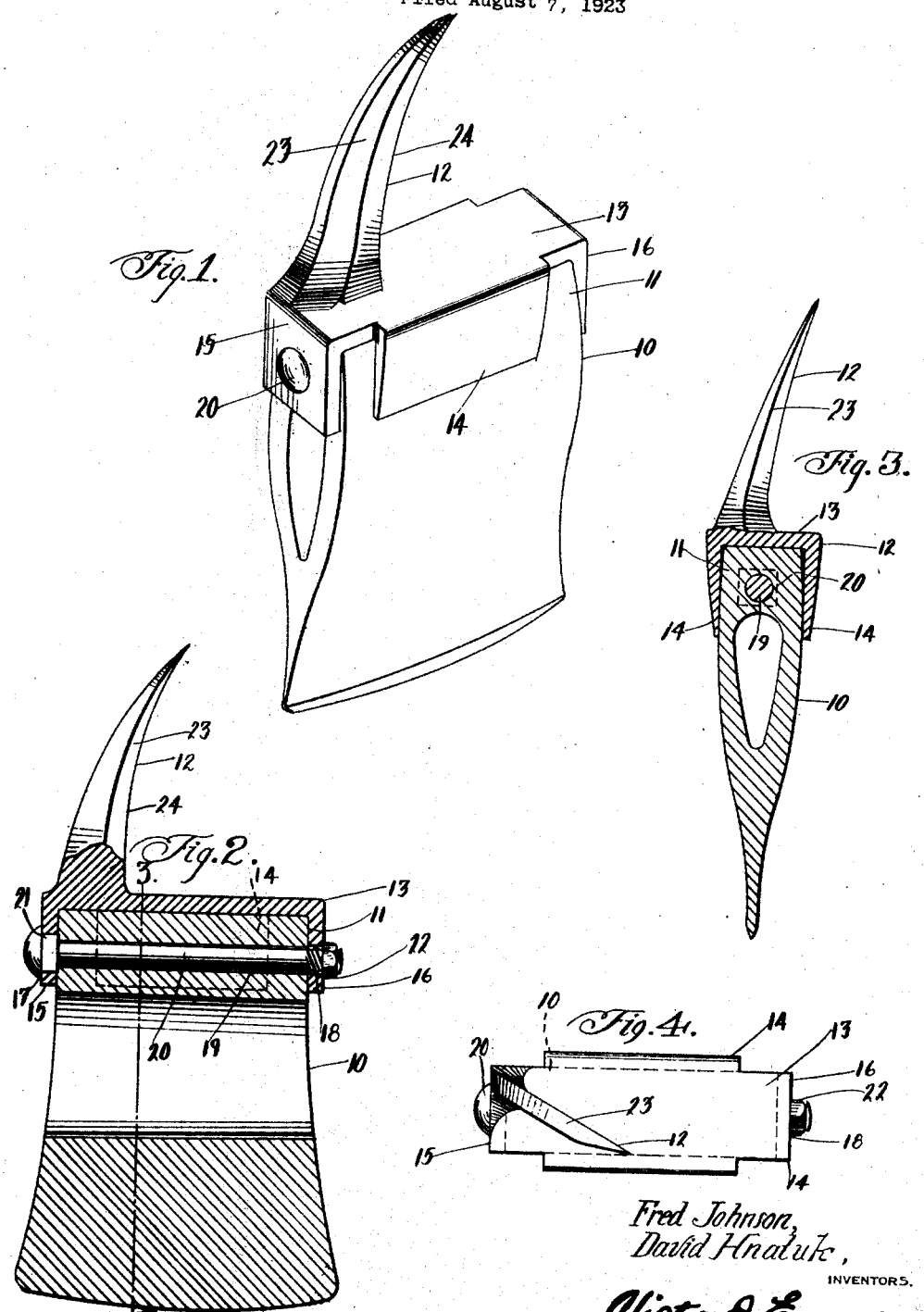

1,569,809

UNITED STATES PATENT OFFICE.

FRED JOHNSON AND DAVID HNATUK, OF DISTRICT OF ALGOMA, ONTARIO, CANADA.

CUTTER.

Application filed August 7, 1923. Serial No. 656,255.

*To all whom it may concern:*

Be it known that we, FRED JOHNSON and DAVID HNATUK, citizens of Germany and Russia, respectively, and residing in the district of Algoma, Province of Ontario, and Dominion of Canada, have invented new and useful Improvements in Cutters, of which the following is a specification.

This invention relates to cutters and has particular reference to a cutter attachment for use upon ax blades.

The principal object of the invention is the provision of a cutter for attachment to the blade of an ax for use in cutting down brush or small trees.

Another object of the invention is to construct a cutter which is easily and quickly applied to the top of an ax blade, and when applied will not interfere with the use of the ax.

A still further object is to provide a cutter which is simple in construction, cheap of manufacture, and highly efficient for the purpose intended.

With these and other objects in view, the invention resides in certain novel construction and combination and arrangement of parts, the essential features of which are hereinafter fully described, are particularly pointed out in the appended claim, and are illustrated in the accompanying drawing, in which:—

Figure 1 is a perspective view of our invention as shown applied to the head of an ax.

Fig. 2 is a longitudinal sectional view therethrough,

Fig. 3 is a transverse sectional view on the line 3—3 of Fig. 2, and

Fig. 4 is a top plan view.

Like characters of reference refer to like parts through the several views of the drawing.

Referring more particularly to the drawing, the reference numeral 10 designates an ax blade of the usual well-known construction, which includes a head 11 and to which our improved cutter 12 is shown applied.

The cutter 12 includes an attaching or base plate 13 stamped from a single piece of material and provided with a pair of depending side flanges 14, for engagement with the side walls of the head 11, and front and rear end flanges 15 and 16 respectively.

The flanges 14, 15 and 16 are all bent downward from the base 13 and serve to prevent any lateral or transverse movement of the cutter with relation to the head. The front flange 15 is formed with a square opening 17 and the rear flange 16 is provided with a round opening 18, both of said openings being in axial alinement with a longitudinal bore 19 drilled in the head 11. A bolt 20 is passed through all of the openings and the same is formed near its head with a square portion 21 for co-action with the opening 17, for preventing turning movement of the bolt. The free end of the bolt is screw-threaded and receives a clamping nut 22. It will thus be seen that the device may be easily and quickly applied to or removed from a head of an ax by the insertion or removal of the bolt. Welded or otherwise secured to the base 13 and rising therefrom at the front thereof is a knife blade 23, formed with a curved knife edge 24 facing toward the rear of the base and arranged at an angle with respect to the length of the same.

In practice, when it is desired to cut down small trees or underbrush, the ax is grasped by the usual handle and the top of the tree or brush to be cut is grasped. The knife blade 23 is placed near the ground and in contact with the tree, after which the same is given an upward pull, thereby severing its connection. It will be understood that the same may be used for various other purposes such as pulling logs, at which time the sharp end of the blade is embedded in the log. It will also be apparent that should the blade become dull the same may be sharpened in the usual well-known manner.

While we have described what we deem to be the most desirable embodiment of our invention, it is obvious that many of the details may be varied without in any way departing from the spirit of our invention, and we therefore do not limit ourselves to the exact details of construction herein set forth nor to anything less than the whole of our invention limited only by the appended claim.

What is claimed as new is:—

In combination with the head of an ax blade, a cutter comprising a base, a pair of depending side flanges formed on said base for engagement with the side walls of the head, front and rear flanges depending from said base and being provided with openings adapted to register with a longitudinal bore formed through the head, a knife blade extending from the base in an opposite direction from the flanges and arranged at an angle with respect to the length of the base, and a bolt passing through the registering bore and openings for securing the cutter to the head, as and for the purpose specified.

In testimony whereof we have affixed our signatures.

FRED JOHNSON.
DAVID HNATUK.